No. 782,049. Patented February 7, 1905.

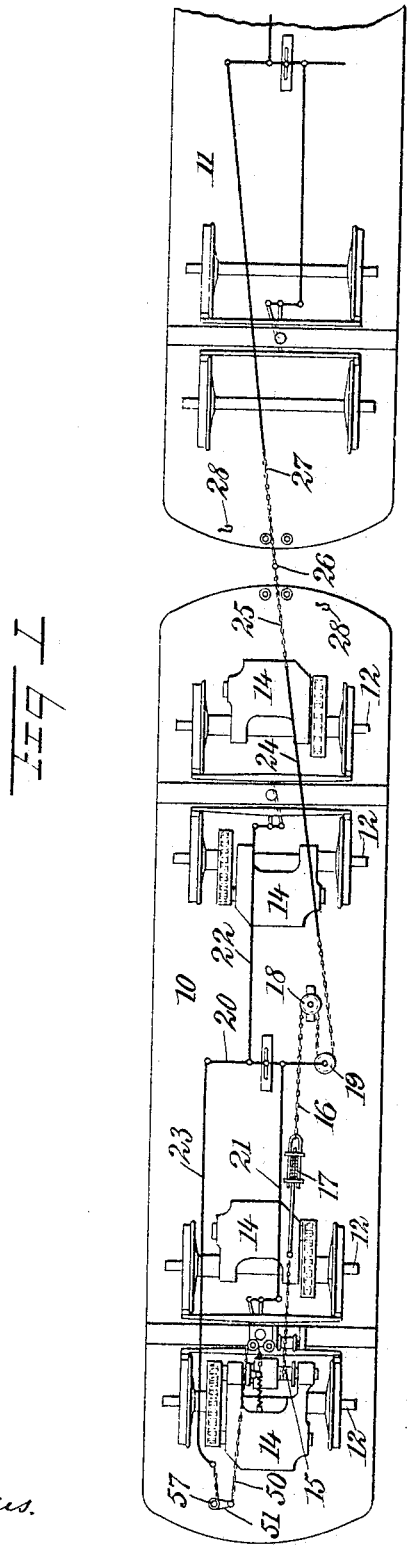

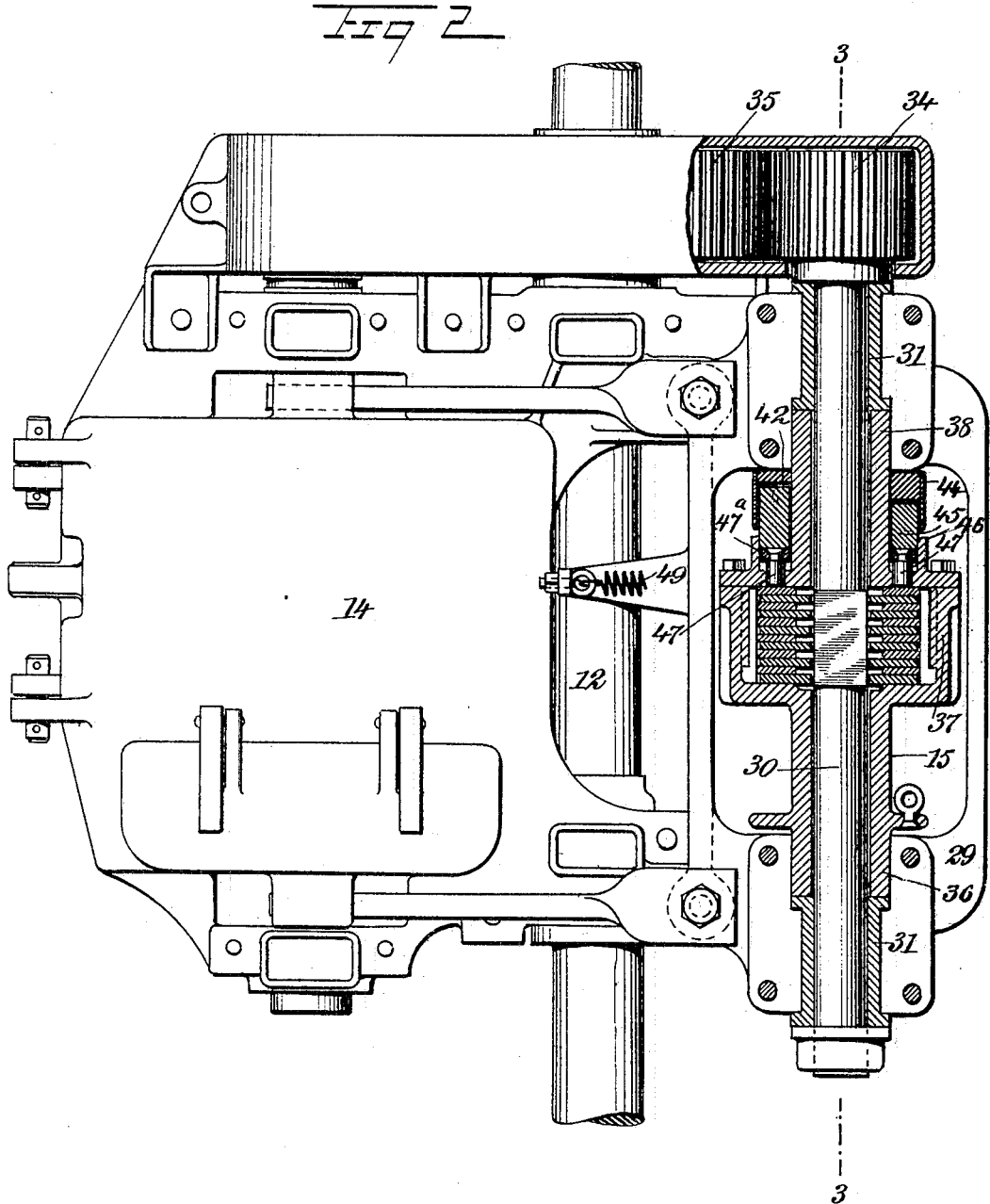

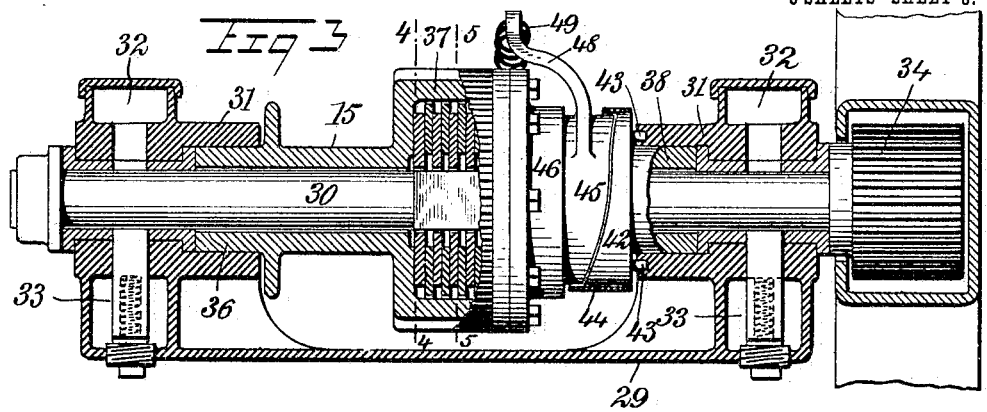
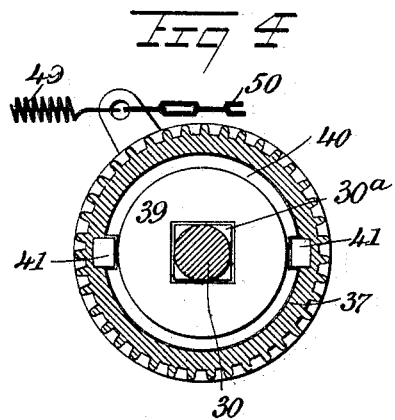
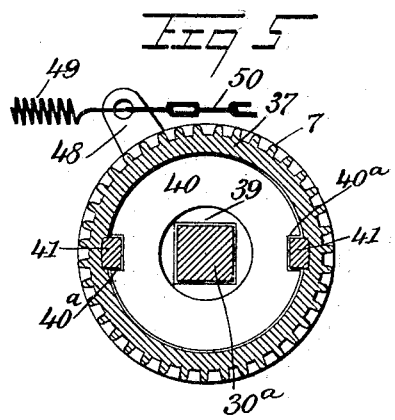
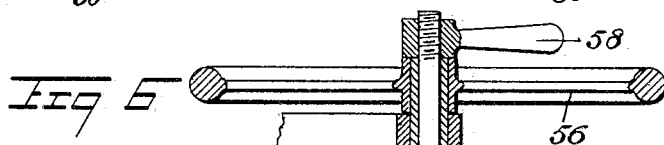
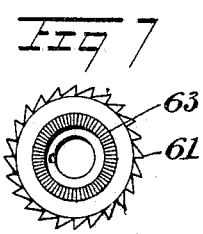
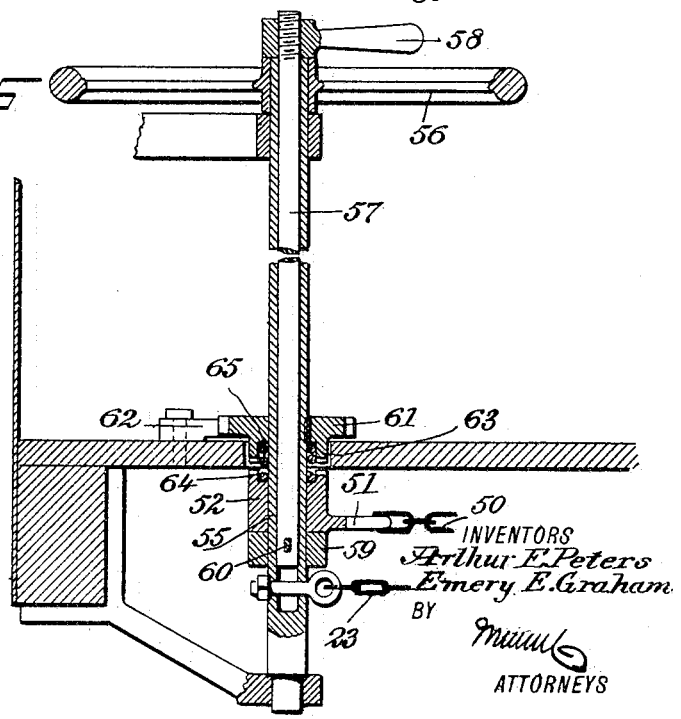

UNITED STATES PATENT OFFICE.

ARTHUR EDWARD PETERS AND EMERY EUGENE GRAHAM, OF CLEVELAND, OHIO.

BRAKE.

SPECIFICATION forming part of Letters Patent No. 782,049, dated February 7, 1905.

Application filed August 6, 1904. Serial No. 219,737.

*To all whom it may concern:*

Be it known that we, ARTHUR EDWARD PETERS and EMERY EUGENE GRAHAM, citizens of the United States, and residents of Cleveland, in the county of Cuyahoga and State of Ohio, have invented a new and Improved Brake, of which the following is a full, clear, and exact description.

The invention relates particularly to a brake adapted for railway-cars and employing as its operating power the momentum of the car or cars.

The invention resides especially in the structure and organization of the gear for connecting the braking-drum with the axle or other mobile part of the car and also in the peculiar manner of connecting the motor-car with a trailer or trailers, so as to apply the brake simultaneously to all of the cars.

The invention resides in certain other novel features of construction and organization, which will be fully set forth hereinafter, and pointed out in the claims.

Reference is had to the accompanying drawings, which illustrate as an example a practical embodiment of our invention, in which drawings like figures of reference indicate like parts in the several views, and in which—

Figure 1 is a bottom plan view showing a motor-car and part of a trailer and illustrating the brake system applied thereto. Fig. 2 is an enlarged plan view showing one of the motors and one of the car-axles and illustrating the brake-drum and the clutch mechanism for connecting it with the axle in section. Fig. 3 is a sectional view of the drum and clutch devices on the line 3 3 of Fig. 2. Fig. 4 is a sectional view on the line 4 4 of Fig. 3. Fig. 5 is a sectional view on the line 5 5 of Fig. 3. Fig. 6 is a vertical section showing the controlling devices, and Fig. 7 is a bottom plan view of the ratchet and clutch illustrated in Fig. 6.

Referring particularly to Fig. 1, 10 indicates the motor-car, and 11 the trailer. As here shown, the motor-car has four axles 12, to each of which a motor 14 is applied. The braking mechanism proper is arranged in connection with one of the motors, preferably the front motor. The drum 15 of the braking mechanism has a chain 16 connected thereto, this chain including a tension device 17, as shown. The chain 17 runs over an idler-sheave 18, mounted on the under side of the car-body, and thence over a sheave 19, carried at one end of a floating lever 20. This lever has connections 21 and 22 extending, respectively, to the brake-beams of the front and rear trucks, and it also has a connection 23 extending to the means for manually operating the brakes, as will be hereinafter fully set forth. The chain 16 after passing around the sheave 19 is joined to a rod 24, which terminates in a chain 25 at the rear end of the motor-car. This chain 25 is adapted to be connected by suitable coupling 26 with a chain 27, connected to the brake-lever system of the trailer, as shown. The coupling 26 is disconnected when the cars are uncoupled, and the chains 25 and 27 may then be held taut by engagement with hooks 28, suitably mounted on the cars, as shown. It is thus apparent that the brake system of a trailer may be connected with the brake system of the motor-car so as to be actuated therefrom, or if the motor-car may be running alone its chain 25 may be connected with its hook 28, and through the medium of said chain 25 and the rod 24 the chain 16 may be properly anchored, so as to permit it to actuate the brake system of the motor-car. The brake systems of any number of trailers may also be connected with that of the motor-car by passing the chain from the motor-car through the train as a continuous chain and connecting it with the brake system of each trailer by means of sheaves on the trailers and sheaves on floating levers joined to the brake-rigging of the trailers, the end of such continuous chain being anchored on the last trailer.

The clutch mechanism for actuating the drum 15 is mounted in a suitable framing 29, preferably sustained by direct connection with the framing of the adjacent motor, said mechanism comprising a shaft 30, around which the drum 15 turns freely. The shaft is sustained in bearings 31 in the frame 29, said bearings having grease-cups 32 and oiler devices 33 effectively to lubricate the shaft.

The shaft is adapted to revolve continuously through the medium of a gear 34, meshed with the motor-driven gear 35, fast on the axle 12. At one end the drum 15 has a tubular extension 36, revolubly mounted in the adjacent bearing 31, and at its other end the drum has a casing 37, formed with a tubular extension 38 at the side opposite the drum, said extension 38 lying loosely around the shaft 30, preferably out of contact therewith and mounted in the bearing 31 adjacent to the gear 34. The drum 15 therefore is supported independently of the shaft 30. The casing or housing 37 contains a series of disks 39 and 40, these disks being alternately arranged and the shaft 30 having a squared portion $30^a$ adjacent to the disks. The disks 40 have round central orifices and are therefore independent of the shaft. Said disks are provided with peripheral notches $40^a$, receiving longitudinally-disposed keys 41, attached to the inner walls of the casing or housing 37, so that the disks are rendered fast on the housing. The disks 39 are of less diameter than the disks 40, and therefore lie inside of and out of engagement with the keys 41; but said disks 39 have square central orifices snugly fitting the squared portion $30^a$ of the shaft 30, and by these means the disks 39 are connected to turn with the shaft. When the disks 39 and 40 are loosely engaged, the shaft 30 and disks 39 turn freely and independently of the disks 40 and casing 37; but when said disks are tightly engaged sufficient friction is developed between them to connect the disks together and to turn the casing 37 and its connected parts with the shaft 30.

Surrounding the tubular extension 38 of the casing 37 is a spiral cam 42, which is held fast to the frame 29 by means of pins 43, engaged in the adjacent bearing 31, or by other equivalent devices, if desired. 44 indicates a dust-guard inclosing said cam 42 and the adjacent parts. Coacting with the cam 42 is a corresponding cam 45, loose on the tubular extension 38 and movable independent thereof toward and from the casing 37.

46 indicates an annular flange formed on or fastened to the casing 37 and inclosing the adjacent part of the cam-collar 45.

The turning movement of the cam-collar 45 will, owing to the coaction between said cam 45 and cam 42, cause the cam 45 to be advanced toward the casing 37, and by means of pins 47, connected to a loose ring $47^a$ and passing through the adjacent wall of the casing 37, a pressure will therefore be exerted upon the disks 39 and 40, causing them to lock with each other and fasten the casing 37 and drum 15 to the shaft 30. The ring $47^a$ loosely surrounds the extension 38 and lies within the annular flange 46. The shaft 30 being connected to revolve continuously with the axle of the car will when the disks 39 and 40 are active, as explained, transmit its movement to the drum 15, and the drum 15 in swinging on the chain 16 will cause the brakes to be applied in a manner which will be fully understood from the drawings and previous description. The instant the pressure on the cam-ring 45 is relaxed the frictional engagement with the disks 39 and 40 ceases and the pressure on the brakes is relieved. The cam-ring 45, therefore, is actuated through the medium of an arm 48 attached thereto. 49 indicates a spring joined to the arm for holding the part 45 yieldingly in inactive position. Also connected to the arm 48 is a chain 50, which extends to and has connection with an arm 51, carried on the collar 52, loose on a tubular shaft 55, standing vertically in the framing of the car at a point convenient to the motorman or other operator, as illustrated in Fig. 6. At its upper portion the tubular shaft 55 is provided with a hand-wheel 56, facilitating its revolution, and within the tubular shaft a rod 57 is freely mounted. The upper end of this rod is threaded and provided with a nut-lever 58, by means of which the rod may be forced to move longitudinally in the shaft 55. Below the collar 52 a collar 59 is loosely mounted on the shaft 55 and provided with a transverse key 60, playing freely in vertical slots in the shaft 55 and connected to the rod 57.

Keyed to the tubular shaft 55 at a point above the floor of the car is a ratchet 61, with which coacts a foot-pawl 62, adapted to be controlled by the operator of the car. The ratchet 61 has a downwardly-projected clutch-face 63, adapted to coact with a corresponding clutch-face 64, formed on the upper end of the collar 52. 65 indicates a spring normally holding said clutch-faces 63 and 64 out of engagement. To the lower part of the tubular shaft 55 the before-described connection 23 is attached, as Fig. 6 illustrates.

It will be observed that when the rod 57 is lowered in the shaft 55 sufficiently to allow the collar 52 to drop into the position shown in Fig. 6 the turning movement imparted to the shaft 55 will not affect the collar 52 and arm 51, and when the parts are in this adjustment the brakes may be applied by hand without interference in any way by the power-brake devices. When, however, the lever-nut 58 is operated to raise the rod 57 and engage the clutch-faces 63 and 64, the turning movement of the shaft 55 will be imparted to the collar 52 and arm 51, and the power-brake mechanism will then become active. By this device we are enabled to operate the hand and power brake devices independently, as desired. If any accident should happen to the power-brake rigging, the motorman can quickly throw the power-brake off and the hand-brake on without leaving go the single hand-wheel 56, thus saving much time otherwise consumed. The power-brake may be operated with equal facility whether the car be running forward or backward, since the chain 50 may wind either way on the drum 15, it being swiveled thereto for that purpose. The variation in distance between the motor-car and trailer does not increase or decrease the pull on the brake-chain on account of the action of the brake in winding up or giving out as is needed to keep the pull on the chain constant when the brake is once set. Also the brake-chain is so wound that the swiveling or turning of the truck will not affect the tension of the chain.

If desired, the casing 37 may be exteriorly ribbed to radiate any heat generated by the frictional operation of the parts.

Various changes in the form, proportions, and minor details of our invention may be resorted to at will without departing from the spirit and scope thereof. Hence we consider ourselves entitled to all such variations as may lie within the terms of our claims.

Having thus described our invention, we claim as new and desire to secure by Letters Patent—

1. The combination with a car-axle of a revoluble shaft, means for mounting the shaft, means for connecting the shaft with the axle, a drum loose on the shaft and adapted to be connected with a brake-rigging, a casing connected to the drum and inclosing the shaft, friction-disks connected respectively with the casing and shaft and inclosed within the casing, and means for moving the friction-disks laterally for the purpose specified said means for moving the disk comprising coacting cams, relatively movable, and an operating device in connection with the other cam.

2. The combination with a car-axle of a revoluble shaft, means for mounting the shaft, means for connecting the shaft with the axle, a drum loose on the shaft and adapted to be connected with a brake-rigging, a casing connected to the drum and inclosing the shaft, friction-disks connected respectively with the casing and shaft and inclosed within the casing, and means for moving the friction-disks laterally for the purpose specified, said means for moving the disks comprising a stationary cam, a movable cam, means for operating the movable cam, and a device in connection with the movable cam and extending into the casing.

3. The combination with a railway-car having a brake-rigging of a tubular shaft having connection with the brake-rigging to permit the manual operation thereof, a power braking mechanism, a clutch member connected with the power braking mechanism and removably mounted on the tubular shaft, a second clutch member fast on the tubular shaft, and means extending through the tubular shaft for connecting and disconnecting the first clutch member with the second clutch member.

4. The combination with a railway-car having a brake-rigging of a tubular shaft having connection with the brake-rigging to permit the manual operation thereof, a power braking mechanism, a clutch member connected with the power braking mechanism and removably mounted on the tubular shaft, a second clutch member fast on the tubular shaft, and means for connecting and disconnecting the first clutch member with the second clutch member, the last-named means comprising a rod extending through the tubular shaft, and having connection with the first clutch member, and devices for imparting a longitudinal movement to the rod.

5. The combination with a railway-car having a brake-rigging of a tubular shaft having connection with the brake-rigging to facilitate the manual operation thereof, a power braking mechanism, a clutch-collar loosely mounted on the tubular shaft and having connection with the power braking mechanism, a ratchet keyed to the tubular shaft and having a clutch-face coacting with the clutch-collar, a pawl coacting with the ratchet, and means extending through the tubular shaft for moving the clutch into engagement with the clutch-face of the ratchet.

6. The combination with a railway-car having a brake-rigging of a tubular shaft having connection therewith manually to operate the same, a power braking mechanism, a clutch-collar loose on the tubular shaft and connected with the power braking mechanism, a ratchet fastened to the tubular shaft and having a clutch-face coacting with the clutch-collar, a pawl coacting with the ratchet, a spring tending to separate the clutch-collar from the clutch-face of the ratchet, a rod passed through the tubular shaft and having connection with the clutch-collar, and means for imparting a longitudinal movement to the rod to engage the clutch-collar with the clutch-face of the ratchet.

7. In a railway-car brake, the combination of a shaft adapted to be driven from an axle of the car, a drum loosely mounted on the shaft, a casing attached to the drum clutch devices contained within the casing for connecting the casing and drum with the shaft, coacting cams mounted around the shaft, one of the cams being movable to actuate the clutch, and means for operating the said movable cam.

8. In a railway-car brake, the combination of a shaft adapted to be driven from the car-axle, a drum mounted loosely on the shaft, means including a clutch for connecting the drum with the shaft, coacting cams mounted around the shaft, one of said cams being movable to actuate the clutch, and means for operating said movable cam.

9. In a railway-car brake, the combination of a shaft adapted to be driven from the car-axle, a brake-rigging, means including a clutch for connecting the same with the shaft, coacting cams mounted around the shaft, one of the cams being movable to actuate the clutch, and means for operating said movable cam.

10. In a railway-car brake, the combination of a shaft adapted to be driven from the car-axle, a drum mounted loosely on the shaft, a casing connected to the drum, a clutch device contained within the casing for connecting the drum and casing with the shaft, coacting cams mounted around the shaft, one of said cams being movable, a pin connected to the movable cam and extending through the casing to engage the clutch devices, and means for operating the movable cam.

11. In a railway-car brake, the combination of a shaft adapted to be driven from the car-axle, a drum loose on the shaft, a casing attached to the drum and having a tubular extension encircling the shaft, clutch devices contained within the casing, and means mounted on the tubular extension of the drum for operating the clutch.

12. In a railway-car brake, the combination of a shaft adapted to be driven from the car-axle, a drum loose on the shaft, a casing attached to the drum and having a tubular extension encircling the shaft, clutch devices contained within the casing, and means mounted on the tubular extension of the drum for operating the clutch, said means comprising coacting cams, one of which is movable, and a pin attached to the movable cam and projecting through the casing into engagement with the clutch devices.

13. The combination with a railway-car having a brake-rigging, of manually-operative means for actuating the brake-rigging, said means including a hollow shaft, a power-operated means for actuating the brake-rigging, a controlling device therefor, a collar mounted on the hollow shaft and having connection with the controlling device, a clutch for fixing the collar to the hollow shaft, and a means extending through the hollow shaft for operating the clutch.

14. The combination with a railway-car having a brake-rigging, of manually-operative means for actuating the brake-rigging, said means including a hollow shaft having a slot therein, a power-operated means for actuating the brake-rigging, a controlling device therefor, a collar loosely mounted on the hollow shaft and having connection with the controlling device, said collar having a clutch-face, a clutch member keyed to the hollow shaft and adapted to be engaged by the clutch-face of the collar, and a means extending through the hollow shaft and having a part passing through the slot thereof to actuate the collar, by which means to move the collar into engagement with the clutch member.

15. The combination with a railway-car having a brake-rigging, of manually-operative means for actuating the same, said means including a hollow shaft, a power-operated means for actuating the brake-rigging, a controlling device for the power-operated means, and means for connecting said controlling device with and disconnecting it from the hollow shaft, said means including a part for extending through the hollow shaft.

In testimony whereof we have signed our names to this specification in the presence of two subscribing witnesses.

ARTHUR EDWARD PETERS.
EMERY EUGENE GRAHAM.

Witnesses:
B. S. BUCHANAN,
W. E. BENFIELD.